Sept. 7, 1926.
W. C. BRIGGS
ELECTRIC CONTROLLER
Filed Jan. 12, 1923 2 Sheets-Sheet 1
1,598,639
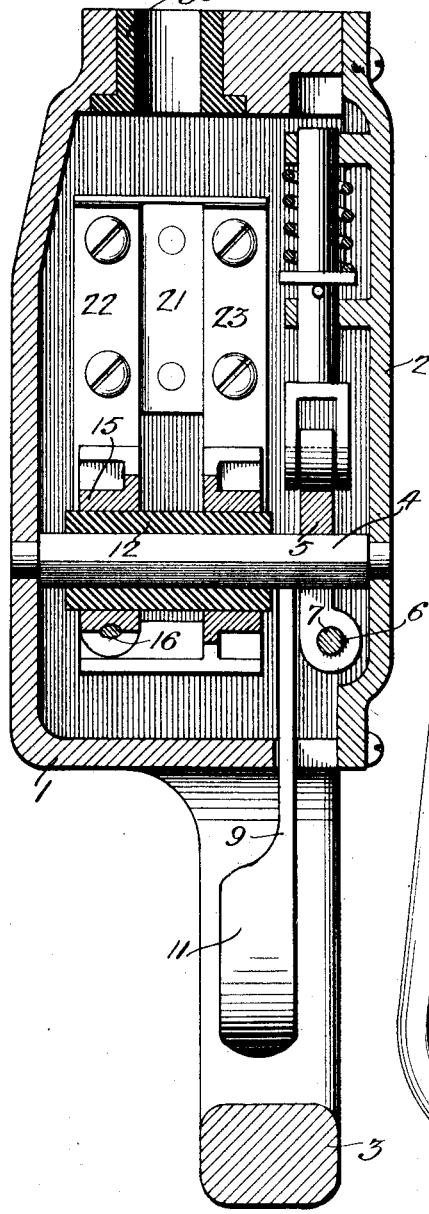
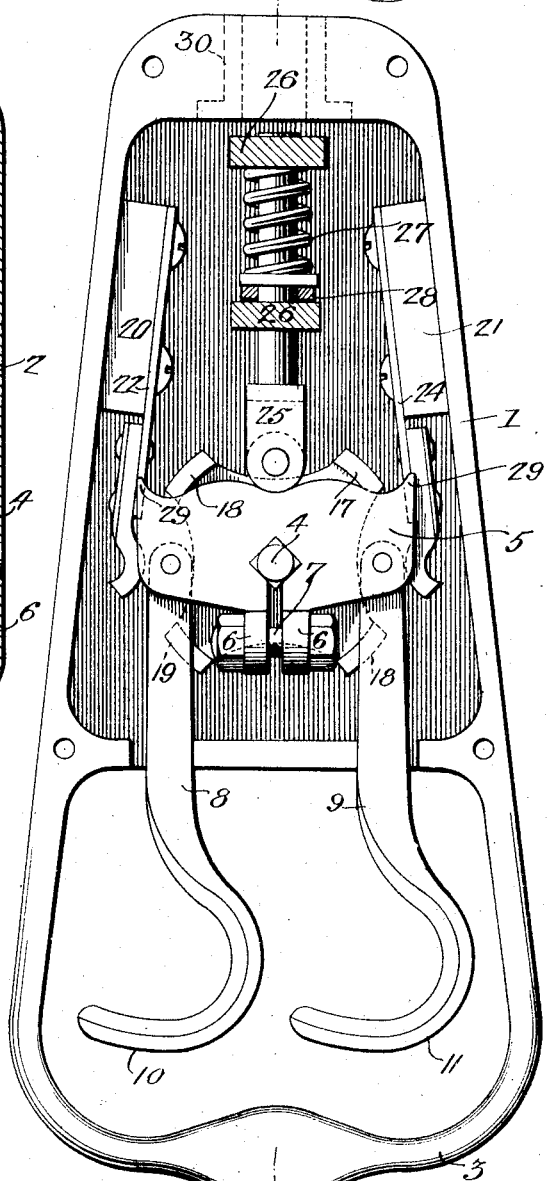
Inventors:-
William C. Briggs,
by his Attorneys,
Howson & Howson Sept. 7, 1926.

W. C. BRIGGS

ELECTRIC CONTROLLER

Filed Jan. 12, 1923 2 Sheets-Sheet 2

1,598,639

Inventor:—
William C. Briggs,
by his Attorneys
Howson & Howson

Patented Sept. 7, 1926.

1,598,639

UNITED STATES PATENT OFFICE.

WILLIAM C. BRIGGS, OF ASHBOURNE, PENNSYLVANIA.

ELECTRIC CONTROLLER.

Application filed January 12, 1923. Serial No. 612,208.

One object of this invention is to provide a relatively simple, substantial and convenient device for controlling the flow of current to an electric motor, and the invention more particularly contemplates a novel form of reversing switch, especially adapted for use in connection with that class of electric motors commonly employed on hoists, cranes and like machinery.

I further desire to provide a form of electric controller particularly adapted for suspension from a current conducting cable, and whose construction shall be such as to permit of its operation with the utmost ease and comfort, the various members of the controller being so constructed and mounted as to reduce to a minimum the likelihood of any of the parts getting out of order.

Another object of my invention is to provide an electric controller having novel means whereby its movable element is caused to automatically return to its "off" or a neutral position when it is released.

My invention further includes a combination of parts which, while effectually protecting the current conducting elements will permit of their convenient inspection and replacement when this is advisable.

These objects and other advantageous ends I attain as hereinafter set forth, reference being had to the accompanying drawings, in which Fig. 1 is a front elevation, partly in vertical section, illustrating an electric controller constructed in accordance with my invention,—the cover plate being removed;

Fig. 2 is a vertical section on the line 2—2, Fig. 1;

Figure 3:
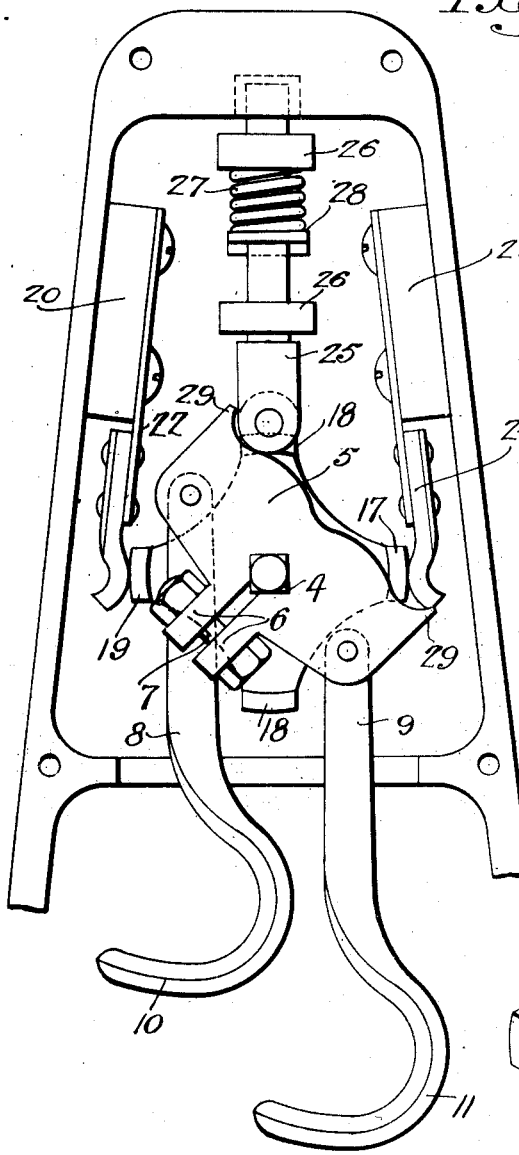
Fig. 3 is a fragmentary elevation, similar to Fig. 1, but showing the movable element in one if its extreme positions.
Figure 4:
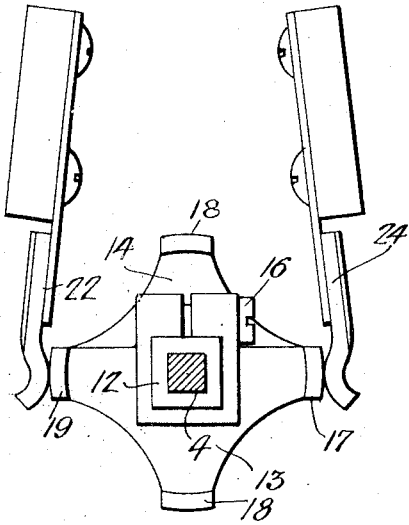
Fig. 4 is a fragmentary elevation, partly in vertical section, illustrating the fixed and movable contacts of the controller.

In the above drawings 1 represents a more or less vertically elongated casing, preferably of cast metal, having an open side normally closed by a cover plate 2 and including an integral, downwardly extending handle portion 3. Extending transversely within the casing and having its ends journaled respectively in the fixed rear side and in the cover plate of the case is a spindle 4 of rectangular cross section, on which is clamped a cam plate 5. This plate is formed with a rectangular opening for the reception of said shaft and has a slot extending into said opening, being provided with a pair of similar lugs 6 for the reception of a bolt 7, whereby it may be caused to rigidly grip or clamp the spindle 4. Two links 8 and 9 are pivotally connected to the opposite ends of the plate 5 and they extend downwardly through an opening in the bottom of the casing 1, having suitable ends or triggers 10 and 11 within the area defined by the handle 3 for the reception of two fingers of an operator;— the arrangement of the parts being such that if the handle be grasped by the hand of an operator, his second and third fingers may conveniently be engaged with said triggers 10 and 11 of the two links, which may then be conveniently drawn down or permitted to move up at will to cause or permit oscillation of the plate 5 and with it the spindle 4.

Figure 5:
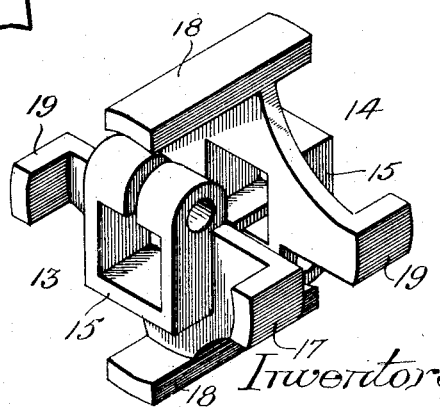
Fig. 5 is a perspective view of the two contact members of the movable element of the controller.

Also mounted on the said spindle 4 is a sleeve 12 of insulating material, preferably rectangular in cross-section and designed for the reception of two contact members 13 and 14. These two members are of similar construction and each of them consists of a split rectangular body 15, designed to be clamped upon the sleeve 12 by means of a screw 16 and having integral with it three projecting contacts 17, 18 and 19. Of these contacts, those indicated at 17 and 19 project in substantially the same straight line on opposite sides of the body 15, while the contact 18 projects from said body in a line at right angles to that of the said other contacts, having a contact face extended parallel with the spindle and of a length substantially three times that of the contact faces of the contacts 17 and 19. The construction is such that when the two members 13 and 14 are mounted on the sleeve 12 so that the long contact 18 of each member overhangs the split or slot in the body of the other member, the face of each contact 17 of one member is adjacent and in substantial alignment with the contact 19 of the other member. As shown in Fig. 5, two long contacts 18 are diametrically opposite each other, as are also the two pairs of aligned contacts 17—19, so that the movable element of the controller has four sets of contacts positioned ninety degrees apart around the spindle on which they are mounted.

Within the casing 1, and mounted on opposite sides thereof, are two insulating blocks or plates 20 and 21, on the first of which are mounted a pair of spring contact fingers 22 and 23, there being a second and similar pair of contact fingers mounted on the second insulating block, of which one finger is indicated at 24. In the present case these two pairs of contact fingers extend downwardly from the insulating blocks 20 and 21 so as to be capable of yieldably coacting with the contacts of the contact members 13 and 14, and the construction and arrangement of the parts is such that under the action of links 8 and 9, the spindle 4 may be turned through an angle of substantially 45 degrees on either side of a neutral position. In one extreme position one of the long contacts 18 will simultaneously engage both of the contact fingers 22 and 23, while the other long contact will similarly engage the two opposite contact fingers carried by the block 21. In the other extreme position of the movable element of the controller, the contact 17 of one of the contact members as 13 and the contact 19 of the other member, will respectively engage the contact fingers 22 and 23, while the other pair of contacts 19 and 17 of said contact members will simultaneously engage the two contact fingers carried by the block 21. When the contact members are in their neutral position, their contacts are disengaged from the contact fingers.

For insuring that the contact members shall normally remain in and at all times tend to return to their neutral position, I provide a roller-carrying plunger 25, longitudinally slidable in a pair of lugs 26 projecting inwardly from the cover plate 2, and mount a spring 27 between one of these lugs and a collar 28 on said plunger so that the latter is at all times pressed toward the adjacent edge of the cam plate 5. This edge is preferably given a double convex outline, including a central depression, and terminates in abutments 29, so that as it is swung from a neutral position in which the plunger engages its central depression, it forces said plunger upwardly against the action of the spring 27 until its further rotation is stopped by engagement of one of its abutments 29 with the plunger, at which time either the long contacts 18 or the pairs of contacts 17—19 are in engagement with the two pairs of contact fingers as above described. Under these conditions, it is obvious that if the force exerted upon the links 8 and 9 be withdrawn, the spring 27 will act through the plunger 25 to return the cam plate 5 to its mid or neutral position shown in Fig. 1, in which the movable contacts are disengaged from the contact fingers.

The casing 1 has at its upper end an opening provided with an insulating bushing 30 for the passage of a cable whose conductors are designed to be electrically connected to the two pairs of contact fingers carried by the insulating blocks 20 and 21, and the weight of the controller as a whole is preferably supported by this cable.

From the above description, it will be noted that the plunger 25 with its spring 27 is carried by and is removable with the cover plate 2, so that not only may the contact members and contact fingers be easily inspected, but if desired, said members may be withdrawn from the casing for dressing up or examination merely by withdrawing the second end of the spindle 4 from its bearing in the rear side of said case.

As will be understood by those skilled in the art, the above switch is particularly adapted for reversing the direction of operation of an electric motor and is especially convenient for controlling motors, such as those used on chain hoists, cranes and similar devices. The construction of the parts is not only rugged and inexpensive, but in addition to being highly simplified, is of such a nature as to require a minimum of attention and repairs.

I claim:

1. An electric controller comprising a casing adapted for suspension from a cable and including a handle; fixed and movable contact members in the casing; and actuating means for said movable contact member consisting of two links extending out of the casing toward the handle and formed for engagement by fingers of an operator.

2. The combination in an electric controller, of a casing, a handle rigidly connected with the casing and spaced therefrom, fixed and movable electric contact members in the casing, and two links connected with the movable member and adapted respectively for moving it in opposite directions, the said links being movable toward and from the handle and being provided with triggers whereby they may be respectively moved by two different fingers of the hand of an operator engaging the said handle.

3. The combination in an electric controller, of a casing, a handle rigidly connected with the casing and spaced therefrom, fixed contacts in the casing, a movable member in the casing and provided with contacts adapted to engage the fixed contacts when the member is in its operative positions, means tending to move the movable member to and maintain it in a neutral position, and two links connected with the movable member and adapted respectively for moving it out of the said neutral position to two different operative positions, the said links being movable toward and from the handle and being provided with triggers whereby they may be respectively moved by two different fingers of the hand of an operator engaging the said handle.

4. The combination in an electric controller of a casing having a removable cover; a spindle having one end journaled in said cover; relatively fixed contacts supported by the casing wall; relatively movable contacts mounted on the spindle in positions to cooperate with the fixed contacts under predetermined conditions; an operating member fixed to the spindle; an actuating link connected to said member and projecting out of the casing, with spring means acting on said operating member to normally maintain the spindle-carried contacts disengaged from the other contacts.

5. The combination in an electric controller of a casing having a removable cover and including a handle; a spindle partly supported by said cover; a cam plate fixed to the spindle; at least one actuating link connected to said cam plate and enclosed by the handle; a spring actuated plunger mounted on the cover in position to co-act with the cam plate to normally maintain it in a definite position; relatively fixed contacts carried within the casing; and relatively movable contacts mounted on the spindle in position to co-act with the fixed contacts under predetermined conditions.

WILLIAM C. BRIGGS.